Jan. 4, 1938.　　　　　A. HEERDE　　　　　2,104,517
ROTARY ENGINE WITH GYRATORY PISTON
Filed April 16, 1935　　　　2 Sheets-Sheet 1
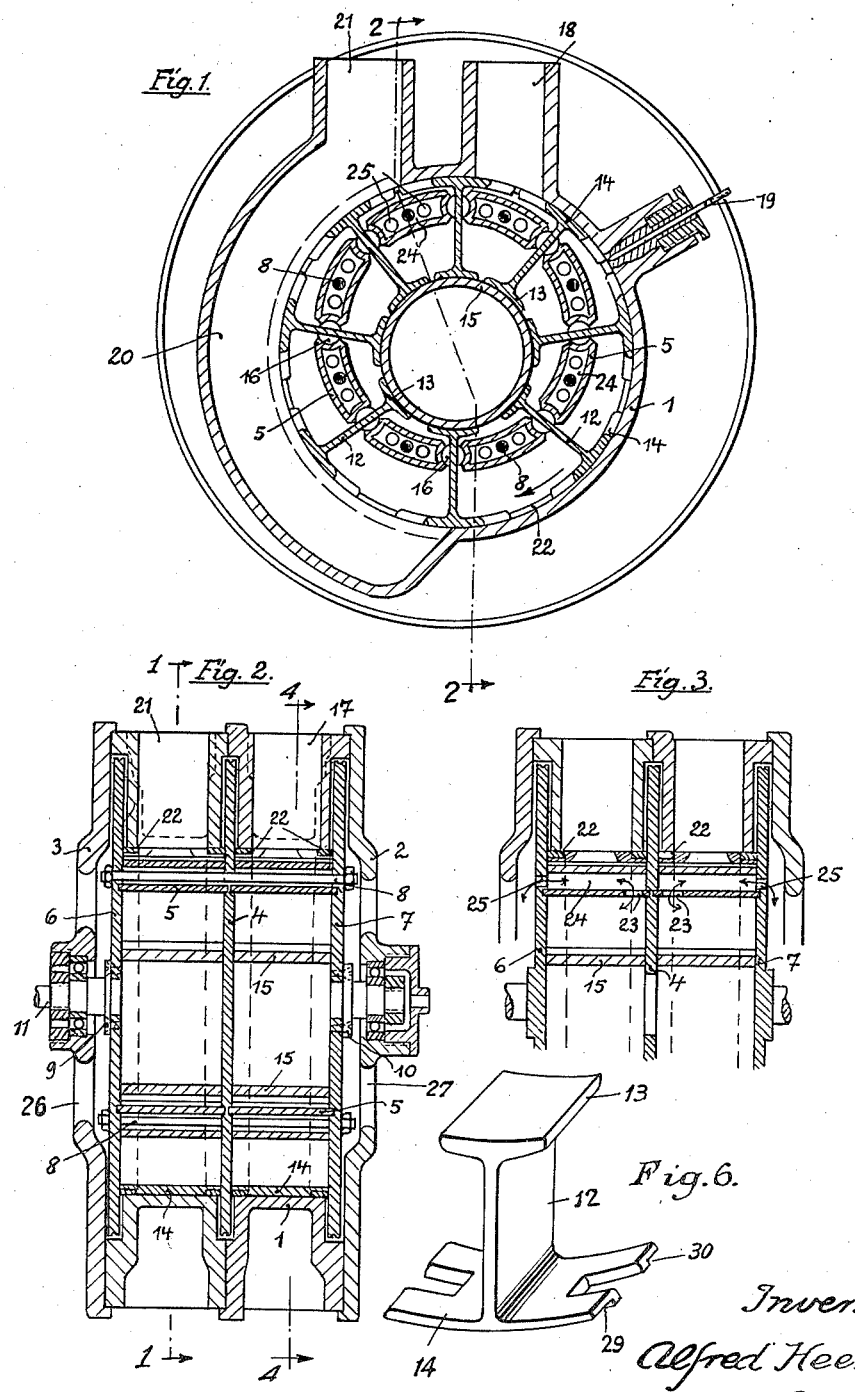

Jan. 4, 1938.  A. HEERDE  2,104,517
ROTARY ENGINE WITH GYRATORY PISTON
Filed April 16, 1935   2 Sheets-Sheet 2

Inventor:
Alfred Heerde

Patented Jan. 4, 1938

2,104,517

UNITED STATES PATENT OFFICE 2,104,517

ROTARY ENGINE WITH GYRATORY PISTON

Alfred Heerde, Breslau, Germany

Application April 16, 1935, Serial No. 16,674
In Germany November 4, 1932

3 Claims. (Cl. 123—16)

In gyratory piston internal combustion engines, having sliding vanes rotating between concentric guiding drums and sliding in a piston drum arranged eccentrically to the guiding drums, it is of particular importance to shut off the working chambers from the outside and from one another in such a way that on the one hand they are completely fluid tight and that on the other hand the friction between the fixed and moving parts is maintained at a minimum. With this object it has already been proposed, particularly in compressors built in a similar way, to use lateral discs which rotate with the piston drum. However, this causes much too much friction to allow of satisfactory use with a power engine and further requires specially made sealing and running surfaces against the fixed parts of the housings and also additional loading springs. As well as being expensive and intricate to manufacture and to fit in the casing, these discs have the disadvantage that, as the result of the unequal expansion caused by heat of the individual parts of internal combustion engines, the discs may easily be caused to distort and jam in the casing and further the springs are soon spoilt by the action of the heat.

In order to avoid these disadvantages particularly in gyratory piston internal combustion engines of the kind having a compressor of a similar construction arranged in the same casing; the invention proposes to attach rigidly together the two side discs of the engine and compressor, the middle disc which separates the engine and compressor, and the piston drums of both machines, while maintaining a clearance between them and the fixed casing. The clearances between the casing, the discs and the sliding vanes are bridged by sealing rings, which shut the working chambers off from the outside and rotating with the discs in a known manner take up the centrifugal force of the sliding vanes.

This construction ensures complete avoidance of friction between the discs and the casing; because the sealing rings form the only contacting surfaces between these parts. Further as the engine becomes hot the discs can expand unhindered relatively to the casing and radially to the rings, so that seizing of the discs is impossible. Finally the manufacture and fitting of the discs is simplified and cheapened, because the discs have not any special sealing ribs or projections. The use of any springs or other additional means for supplementing the sealing, which is done solely by the rings that rotate with the discs, between these and the casing, is likewise avoided; so that the machine always remains ready for use.

The object of the invention is illustrated in the attached drawings by an exemplary construction and there is shown in:

Figure 1 a sectional view of the engine on the line 1—1 of Figure 2.

Figure 2 a section on the line 2—2 of Figure 1.

Figure 3 a part section showing the direction of flow of the cooling air.

Figure 6 is a perspective view of a slide vane.

Figure 4:
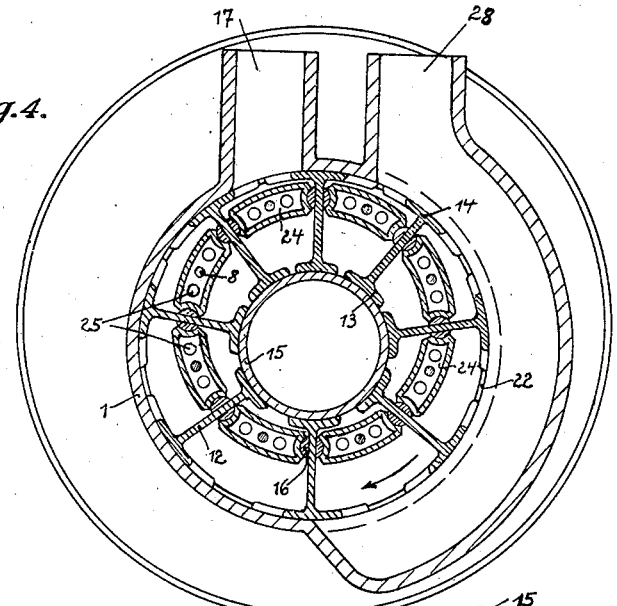
Figure 4 is a section on line 4—4 of Figure 2.
Figure 5:
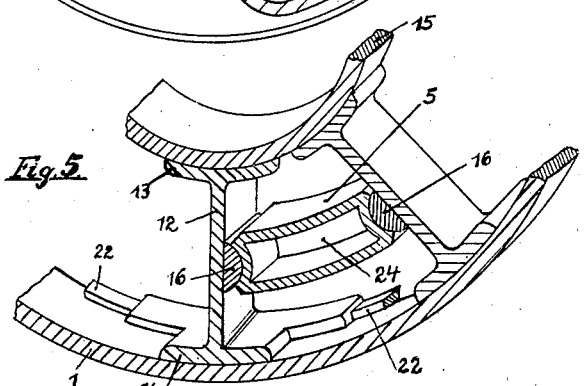
Figure 5 is a broken perspective, partly in section, showing the arrangement of the slide vanes with respect to the inner and outer drums and with respect to the rotor.
Figure 7:
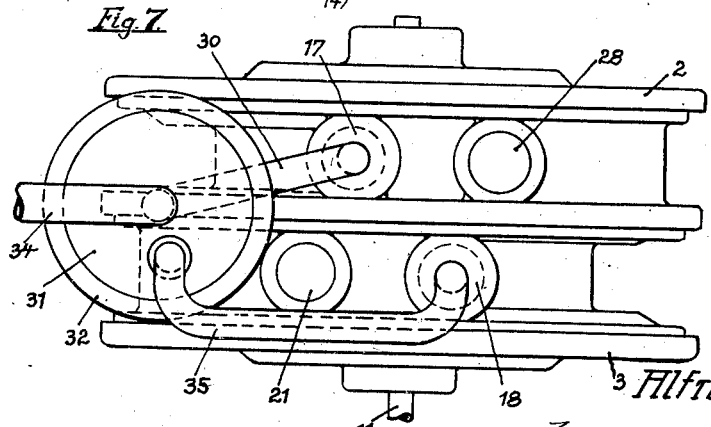
Figure 7 is a plan view of the engine and the carburetor.

In the exemplary construction shown, a gyratory piston internal combustion engine and a gyratory piston compressor are arranged together coaxially in a fixed casing consisting of the outer drum 1 and the two casing discs 2 and 3. A partition 4 is attached to the piston drum 5, which consists of individual sectors 5' and which is arranged eccentrically in relation to the drum 1, and secured to the lateral discs 6 and 7 by bolts 8. The lateral discs 6 and 7 are fixed to the flanges 9 and 10 of the shaft 11, which is carried by the casing discs 2 and 3 of the housing. The slide vanes 12 are provided with sliding shoes 13 and 14, which press against the outer drum 1 and the concentric inner drum 15 and provide a seal. They slide in the rollers 16 of the piston drum 5 being likewise sealed. These rollers 16 enable the angular position of the slide vanes to alter relative to the piston drum; this is necessary due to the movement of the piston drum 5 eccentric to the casing. The vanes are held by their sliding shoes always in a position radial to the drums 1 and 15.

The lateral discs 6 and 7 and also the partition 4 are so arranged on the shaft that they rotate relatively to the stationary parts with a small clearance and so frictionlessly. The sealing, which thus becomes necessary, between the side discs 6, 7 or the partition 4 and the housing is done by rings 22, which seal against the discs or the partition and the outside drum. The shoes 14 of the slide vanes also lie on these rings 22, so that the rings take up the centrifugal pressure resulting from their rotation, without however preventing the sliding shoes from lying against the bearing surface of the outer drum 1 in such a way that the individual compartments are sealed from each other.

Due to this construction the friction between the rotating and the fixed parts of the engine is reduced to the minimum while completely ensuring fluid tight joints.

The port 17 of the compressor leads via a wick vaporizer not shown in the drawings to the port 18 of the internal combustion engine, which port passes through the outer drum 1 at the place where the working compartments of the internal combustion engine begin to increase in volume. The ignition device 19 is provided close to this place in the direction of rotation. The outer drum 1 is cut away beginning at the point of the greatest volume of the combustion chambers and extending to the completion of exhaust, in order to allow the exit of the products of combustion via the channel 20 and the port 21.

In the internal combustion engine and also in the compressor only those kinds of working chambers are used which are enclosed between the piston drum 5 and the outer drum 1 by the webs of the vanes 12. The corresponding chambers between the piston drum 5 and the inner drum 15 are used, in the construction illustrated, for the introduction of the cooling air for the engine. Accordingly they are connected by openings 23 with the open interiors 24 of the piston drum 5 which are further connected via openings 25 in the lateral discs 6 and 7 and via corresponding openings 26, 27 in the casing discs 3 and 2 with the exterior air. The enlargement and diminution of the spaces between the piston drum 5 and the interior drum 15 caused by the rotation of the motor produces a current of cooling air which passes through the piston drum.

In use the engine takes fresh air into the chambers in that half of the engine which acts as a compressor (lying on the right in Figure 2), through a port 28 (see Figure 4). These chambers have at that moment an increasing volume due to the eccentric rotation of the piston drum 5 and on further rotation of the piston drum 5 begin to decrease in size again. The enclosed air is thus compressed and leaves the compressor by the port 17 which leads to the vaporizer. The resultant mixture in the vaporizer, which due to the action of the compressor is strongly compressed, passes through the port 18 (Figure 1) in the left half of the casing 1 and fills the working chambers of the combustion engine at the moment when they are at their smallest volume. The further rotation of the piston drum in a clockwise direction takes the chamber which is filled with mixture past the ignition device 19. The combustion gases resulting from the explosion exert a thrust on the webs of the sliding vanes 12 and on the piston drum 5 and after their expansion in the working chambers, which grow larger due to the rotation of the piston drum, pass into the channel 20, whence they leave via the exhaust 21. Since the walls of the drum 1 are cut through to the channel 20, as can be seen in Figure 1, almost as far as the inlet port 18, the working chambers are almost completely free from combustion products when they are again filled with combustible mixture.

It is obvious that the vaporizer need not be placed between the compressor and the engine, but might be connected in front of the compressor, so that the latter would suck in not fresh air, but mixture, would compress it and direct it into the engine.

What I claim is:

1. In a piston internal combustion engine, a casing having inlet and exhaust ports, concentric guide drums, a rotating piston arranged between and eccentric to the guide drums, radial sliding vanes rotating between the concentric guide drums and sliding through the rotating piston drum, lateral discs enclosing working chambers formed between the sliding vanes and the said drums, the said discs being rigidly connected to the rotating piston and providing a clearance between said discs and the casing, sealing rings bridging the clearance between the casing, the discs and the sliding vanes, said sealing rings rotating with the discs to take up the centrifugal force of and to guide the sliding vanes across the exhaust port.

2. In a piston internal combustion engine, a casing formed with inlet and exhaust ports, concentric guide drums, a rotating piston drum arranged eccentrically to the guide drums, radial sliding vanes rotating between the concentric guide drums and sliding through the rotating piston drum, lateral discs enclosing working chambers formed between the sliding vanes and the said drums, a middle disc dividing the engine into a compressor and a motor of similar constructions, the said discs being rigidly connected to the rotating piston drum while maintaining a clearance between the fixed parts of the casing, and sealing rings bridging the clearance between the casing, the discs and the sliding vanes, said sealing rings rotating with the discs to take up the centrifugal force of and to guide the sliding vanes across the exhaust port.

3. In a piston internal combustion engine, a stator including a casing, an outer drum formed with inlet and exhaust ports and side casing discs, a rotor including an inner guide drum, a rotating piston drum arranged eccentrically to the guide drum, and radial sliding vanes rotating between the inner and outer drums and sliding through the rotating piston drum, lateral discs enclosing working chambers formed between the sliding vanes and the inner and outer drums, a middle disc dividing the engine into a compressor and a motor of similar constructions, the middle disc and the lateral discs being rigidly connected to the rotating piston drum while maintaining a clearance between the outer drum and casing, sealing rings bridging the clearance between the casing, the lateral discs and the sliding vanes and rotating with the discs to take up the centrifugal force of and to guide the sliding vanes across the exhaust port, openings in the side casing discs, the lateral discs and the rotating piston drum and connecting the working chambers enclosed between the radial sliding vanes, the inner guide drum and the rotating piston drum to the external air, whereby to lead the air drawn in and pushed out by the said working chambers through the interior of the rotating piston drum, the air drawn in by the working chambers of the compressor enclosed between the radial sliding vanes, the outer drum and the rotating piston drum being pressed to a carburetor and from the carburetor to the corresponding working chambers of the motor.

ALFRED HEERDE.